(12) United States Patent
Ikeno et al.

(10) Patent No.: US 7,804,567 B2
(45) Date of Patent: Sep. 28, 2010

(54) NORMALLY-WHITE TWISTED-NEMATIC-MODE LCD DEVICE

(75) Inventors: Hidenori Ikeno, Kanagawa (JP); Yoichi Sasaki, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 989 days.

(21) Appl. No.: 11/280,569

(22) Filed: Nov. 16, 2005

(65) Prior Publication Data

US 2006/0103795 A1    May 18, 2006

(30) Foreign Application Priority Data

Nov. 17, 2004    (JP) .............................. 2004-333200

(51) Int. Cl.
    *G02F 1/1335* (2006.01)
(52) U.S. Cl. ..................... 349/121; 349/117; 349/119
(58) Field of Classification Search ................. 349/117, 349/119, 121
    See application file for complete search history.

(56) References Cited

U.S. PATENT DOCUMENTS

| | | | |
|---|---|---|---|
| 5,583,679 A * | 12/1996 | Ito et al. ..................... | 349/118 |
| 2001/0043302 A1 * | 11/2001 | Inoue et al. ................. | 349/137 |
| 2005/0162592 A1 | 7/2005 | Hirakata et al. ............. | 349/119 |

FOREIGN PATENT DOCUMENTS

| | | |
|---|---|---|
| JP | 05-019249 | 1/1993 |
| JP | 06-222213 | 8/1994 |
| JP | 11-024066 | 1/1999 |
| JP | 2002-182213 | 6/2002 |
| JP | 2004-318118 | 11/2004 |
| JP | 2005-037938 | 2/2005 |
| JP | 2005-202212 | 7/2005 |
| JP | 2006-091703 | 4/2006 |

OTHER PUBLICATIONS

Japanese Official Action dated May 25, 2010.

* cited by examiner

*Primary Examiner*—David Nelms
*Assistant Examiner*—Nathanael R Briggs
(74) *Attorney, Agent, or Firm*—Hayes Soloway P.C.

(57) ABSTRACT

A normally-white twisted-nematic mode LCD device includes a first optical compensation film between a light-incident-side polarization film and an LC cell, and a second optical compensation film between a light-emitting-side polarization film and the LC cell. The optical axis of the first (second) optical compensation film projected onto the substrate surface is substantially parallel to the longer axis of an equivalent refractive index ellipsoid of a residual retardation of the LC layer in the vicinity of a light-incident-side (light-emitting-side) substrate upon display of black color.

12 Claims, 7 Drawing Sheets

NORMALLY-WHITE TWISTED-NEMATIC-MODE LCD DEVICE

BACKGROUND OF THE INVENTION (a) Field of the Invention

The present invention relates to a liquid crystal display (LCD) device and, more particularly, to a normally-white twisted-nematic-mode (TN-mode) LCD device including liquid crystal (LC) molecules having a twisted angle of around 90 degrees.

(b) Description of the Related Art

In general, TN-mode LC devices include first polarization film, first glass substrate, LC layer, second glass substrate, and second polarization film, which are arranged in this order as viewed from the light incident side thereof. The LC layer includes therein LC molecules having a longer axis aligned parallel to the substrate surface upon applying no electric field thereto, and the LC molecules are twisted by 90 degrees in the longer axis thereof from the first substrate to the second substrate. In the normally-white TN-mode LCD device, the first and second polarization films are arranged so that the polarization axes thereof are disposed perpendicular to each other and thus the LCD device exhibits white color upon application of no electric field.

There are two modes of the TN-mode LCD device as to the basic relationship between the arrangement of the polarization axis of the polarizing films and the orientation of the LC molecules: an e-mode wherein the transmission axis of a polarization film is parallel to the longer axis of the LC molecules on the interface between the LC layer and the substrate near the polarization film; and an o-mode wherein the transmission axis of a polarization film is perpendicular to the longer axis of the LC molecules on the interface between the LC layer and the substrate near the polarization film.

A viewing angle characteristic, showing a range of the viewing angle in which the LCD device achieves a specific contrast ratio or above, is known as one of the important indexes of the performances of the LCD device. The specific contrast ratio employed heretofore is 10:1, for example, as a luminance ratio of white color to black color measured in a printed sheet wherein a high-quality sheet of white paper is printed with a black ink. In a catalogue of the LCD devices, for example, the viewing angle characteristic of the vertical direction and the horizontal direction is listed for each LCD device, with the vertical direction of the LCD device being set parallel to the longer axis of the LC molecules residing at the middle of the LC layer between the substrates upon display of white color, and with the horizontal direction being set parallel to the longer axis.

It is known in the TN-mode LCD device that the refractive index anisotropy of the LC layer reduces the contrast ratio in a slanted viewing direction to degrade the viewing angle characteristic of the LCD device. Patent publication No. JP-A-5(1993)-19249 describes a solution for the problem of the refractive index anisotropy by using an optical compensation film. FIG. 7 shows the described LCD device in an exploded view. The LCD device 200 includes an LC cell 10 having therein an LC layer sandwiched between a pair of glass substrates, a retardation film 13, 14 between a light-incident-side polarization film (referred to as polarizer hereinafter) 11 and the LC cell 10 as well as between a light-emitting-side polarization film (referred to as analyzer hereinafter) 12 and the LC cell 10.

The transmission axes P1, P2 of the polarizer 11 and analyzer 12 are perpendicular to each other. The LC layer in the LC cell 10 has an orientation A0 parallel to the transmission axis P1 of the polarizer 11 in the vicinity of polarizer 11. The LC layer also has an orientation B parallel to the transmission axis P2 of the analyzer 12 in the vicinity of the analyzer 12. In addition, the light-incident-side orientation A0 of the LC layer is substantially parallel to the slow axis R1 of the retardation film 13, whereas the light-emitting-side orientation B of the LC layer is substantially parallel to the slow axis R2 of the retardation film 14. It is recited in the patent publication that setting of the relationship between the orientation of the LC layer and the retardation as such suppresses reduction in the contrast ratio in a slanted viewing direction, to thereby improve the viewing angle characteristic of the LCD device.

DISCLOSURE OF THE INVENTION (a) Problem to be Solved by the Invention

In the normally-white LCD device 200, the LC cell 10 is applied with an electric field upon display of black color to tilt the LC molecules therein. However, the LC molecules on the interface between the LC layer and the substrate either on the light incident side or light emitting side cannot be tilted due to the presence of the orientation film (not shown) which fixes the orientation of the LC molecules in contact therewith.

If the voltage applied to the LC layer upon display of black color is sufficiently high, the LC molecules in the vicinity of the interface can be also tilted to a desired tilt angle by the applied voltage except for the LC molecules on the interface. Thus, as described in the patent publication, by setting the slow axis of the retardation films 13, 14 parallel to the orientation A0, B of the LC molecules on the interface, the residual retardation of the LC cell 10 can be compensated by the retardation films 13, 14.

It is noted that the voltage Vw applied upon display of a black color in a normal condition is three to four times the threshold voltage Vth of the LC at most. The threshold voltage Vth of the LC as used herein can be expressed by the following equation:

$$Vth = \pi \sqrt{\frac{K_{11} + (K_{33} - 2K_{22})/4}{\varepsilon_0 \Delta \varepsilon}}$$

where $K_{11}$, $K_{22}$ and $K_{23}$ are elastic coefficients of the LC for splay deformation, twisted deformation and bending deformation, respectively, and $\varepsilon_0$ and $\Delta \varepsilon$ are electric constant and dielectric constant anisotropy of the LC, respectively. In fact, such an applied voltage Vw around three to four times the threshold voltage Vth can hardly tilt the LC molecules in the very vicinity of the interface to a desired tilt angle. Thus, a retardation is generated by the LC molecules which cannot be tilted by the applied voltage Vw to the desired tilt angle, thereby incurring a residual retardation in the LC cell 10.

The residual retardation generated upon display of black color can be expressed by an equivalent refractive index ellipsoid. Since the LC molecules are twisted in the LC layer, the longer axis (optical axis) of the equivalent refractive index ellipsoid projected onto the substrate surface does not coincide with the transmission axis (or absorption axis) of the polarizer 11 or the transmission axis (or absorption axis) of the analyzer 12. Thus, even if the slow axis of the retardation films 13 or 14 is parallel to the orientation A0 or B of the LC molecules on the interface, the retardation films 13, 14 cannot well compensate the residual retardation in the LC cell 10, resulting in an insufficient improvement in the viewing angle characteristic.

In view of the above, it is an object of the present invention to provide an LCD device which is capable of achieving a viewing angle characteristic in which at least a viewing angle of 80 degrees with respect to the screen allows the LCD device to provide a contrast ratio of 10:1 or above on the screen.

(b) Summary of the Invention

The present invention provides a normally-white liquid crystal display (LCD) device including first polarization film, fist optical compensation film, first substrate, first transparent electrode, first orientation film, twisted-nematic liquid crystal (LC) layer, second orientation film, second transparent electrode, second substrate, second optical compensation film, and second polarization film, which are consecutively disposed in a direction of light transmission, wherein; the first polarization film has a polarization axis perpendicular to a polarization axis of the second polarization film; an optical axis of the first optical compensation film projected onto a substrate surface of the first or second substrate is substantially parallel to a longer axis of a first equivalent refractive index ellipsoid projected onto the substrate surface, the first equivalent refractive index ellipsoid representing a residual retardation of the LC layer in a vicinity of a first interface of the LC layer with respect to the first substrate upon display of black color by applying a first voltage between the first transparent substrate and the second transparent substrate to determine an orientation of LC molecules in the LC layer; and an optical axis of the second optical polarization film projected onto the substrate surface is substantially parallel to a longer axis of a second equivalent refractive index ellipsoid projected onto the substrate surface, the second equivalent refractive index ellipsoid representing a residual retardation of the LC layer in a vicinity of a second interface of the LC layer with respect to the second substrate upon the display of black color.

In accordance with the LCD device of the present invention, the configuration wherein the optical axis of the first (second) optical compensation film projected Onto the substrate surface is substantially parallel to the longer axis of the equivalent refractive index ellipsoid of the residual retardation of the LC layer in the vicinity of the first (second) interface upon display of black color allows the residual retardation of the LC layer upon display of black color to be compensated, thereby improving the contrast ratio in the front view to increase the viewing angle characteristic of the LCD device especially in the horizontal direction.

In the LCD device of the present invention, the first voltage may be three to four times a threshold voltage Vth of the LC layer, the threshold voltage Vth representing Freedericksz transition point of LC in the LC layer. In this configuration, it is probable that the applied voltage does not tilt the LC molecules on the interfaces to a desired tilt angle to incur a residual retardation in the vicinity of the interfaces. The configuration wherein the optical axis of each optical compensation film coincides with the longer axis the corresponding equivalent refractive index of the residual retardation allows the incurred residual axis to be effectively compensated to thereby improve the contrast ratio of the LCD device.

It is preferable that the following relationship:

$$0.5 \times \theta Tw - 47.5 \leq \Delta\theta 2 \leq 0.5 \times \theta Tw - 43.8$$

hold, where θTw is a twisted angle of the LC layer, $\Delta\theta 2$ ($\Delta\theta 2 > 0$) is an angle measured from the optical axis of the first optical compensation film projected onto the substrate surface to the polarization axis of the first polarization film, and $-\Delta\theta 2$ is an angle measured from the optical axis of the second optical compensation film projected onto the substrate surface to the polarization axis of the second polarization film, assuming that the angle is positive when measured in a clockwise direction as viewed along the direction of light transmission. Use of this configuration allows the viewing angle which provides a contrast ratio of 10:1 or above to be 80 degrees or higher.

It is also preferable that the following relationship:

$$\Delta\theta 2 < \Delta\theta 1$$

hold, assuming that an angle between the orientation of the LC layer in the vicinity of the first interface projected onto the substrate surface and the polarization axis of the first polarization film is $-\Delta\theta 1$ ($\Delta\theta 1 > 0$), and an angle between the orientation of the LC layer in the vicinity of the second interface projected onto the substrate surface and the polarization axis of the second polarization film is $\Delta\theta 1$. In general, the longer axis of the equivalent refractive index is within the twisted angle of the LC layer. The configuration wherein $\Delta\theta 2$ is less than $\Delta\theta 1$ allows the angle between the optical axis of the first optical compensation film projected onto the substrate surface and the optical axis of the optical compensation film projected onto the substrate surface to be less than the twisted angle, whereby the residual retardation upon display of black color can be effectively compensated.

Use of the preferable configurations as described above may allow the LCD device to have a viewing angle characteristic wherein a viewing angle of 80 degrees in a horizontal direction provides a contrast ratio of 10:1 or above, and wherein a viewing angle of 80 degrees in either a top or bottom direction provides a contrast ratio of 10:1 or above.

It is preferable that the first optical compensation film compensate a retardation of a portion of the LC layer near the first substrate, and the second optical compensation film compensate another portion of the LC layer near the second substrate. This configuration is especially effective to reduce the leakage of light in a slanted viewing direction, and thus improve the contrast ratio in the slanted viewing direction.

It is preferable that the first and second optical compensation films each have a negative single-axis optical characteristic wherein the optical axis thereof is inclined from the substrate surface by a specific angle. In this configuration, allowing the inclination of optical axis of the optical compensation films to substantially coincide with the inclination of the longer axis of the equivalent refractive index ellipsoid effectively compensate the residual retardation.

It is preferable that the first and second optical compensation films each include a plurality (n) of layers each including a negative single-axis optical characteristic. In this configuration, by allowing the longer axis of the equivalent refractive index ellipsoid of the residual retardation of each of n virtual thin films of the LC layer projected onto the substrate surface to coincide with the optical axis of a corresponding one of the n discotic layers projected onto the substrate surface, the residual retardation can be especially effectively compensated.

In the above configuration wherein each optical compensation film includes a plurality (n) of layers, each of m layers among the n layers ($0 \leq m < n$) may have an optical axis perpendicular to the substrate surface. Some of the n layers may be inclined from the normal line of the substrate surface.

A configuration may be employed wherein (n−m) layers among the n layers other than the m layers are configured by (n−m) discotic layers each having a negative single-axis optical characteristic. In an alternative, all the n layers may be discotic LC layers.

It is preferable that the LCD device be an active-matrix-drive LCD device including a switching device in each of pixels, and the switching device is a TFT (thin-film-transistor) or MIM (metal-insulator-metal) switching device.

The above and other objects, features and advantages of the present invention will be more apparent from the following description, referring to the accompanying drawings.

PREFERRED EMBODIMENT OF THE INVENTION

Figure 1:
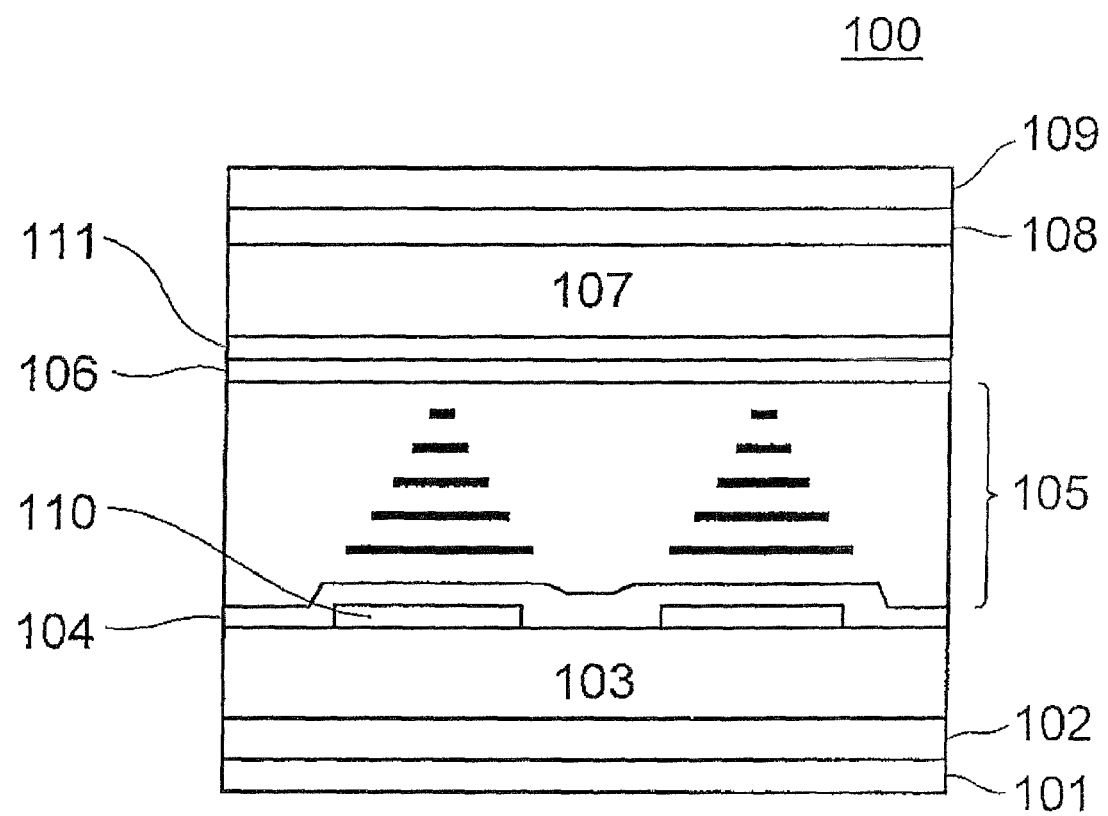
FIG. 1 is a sectional view of an LCD device according to a first embodiment of the present invention.

Now, the present invention is more specifically described with reference to accompanying drawings, wherein similar constituent elements are designated by similar reference numerals throughout the drawings.

Figure 7:
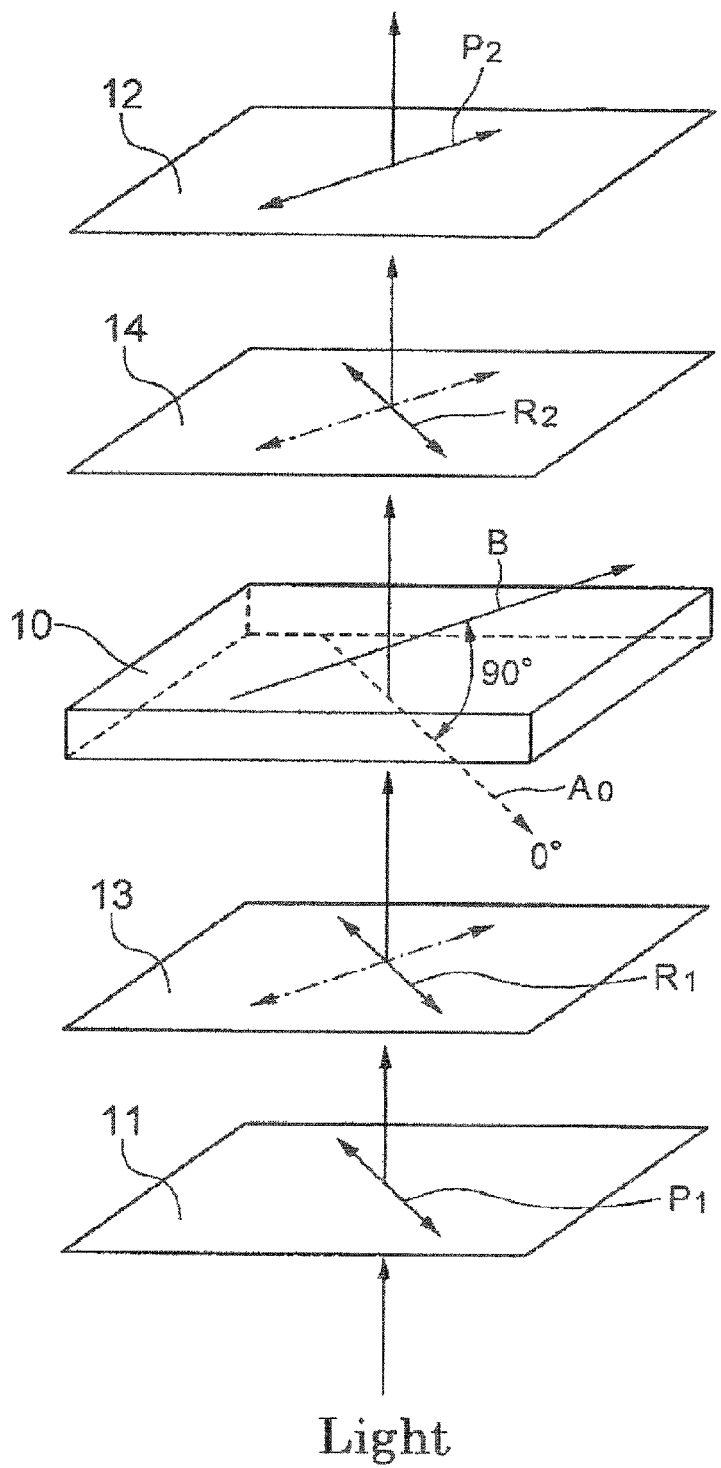
FIG. 7 is an exploded perspective view of a conventional LCD device.

FIG. 1 shows an LCD device, generally designated by numeral 100, according to a first embodiment of the present invention. The LCD device 100 is of a normally-white twisted-nematic mode, and includes first polarization film 101, first optical compensation film 102, first glass substrate 103, first orientation film 104, an LC layer 105, second orientation film 106, second glass substrate 107, second optical compensation film 108 and second polarization film 109. The structure of the LCD device of the present embodiment is similar to that shown in FIG. 7.

The first and second polarization films 101, 109 each have a function of passing therethrough the light having a polarization aligned with the polarization axis thereof The first and second polarization films 101 and 109 have polarization axes (and absorption axes) perpendicular to each other. The first glass substrate 103 configures a TFT (thin-film-transistor) substrate, for example, whereas the second glass substrate 108 configures a color-filter substrate or counter substrate, for example. The LC layer 105 includes therein TN-mode LC, and has a twisted angle of 94 degrees, for example. The first and second glass substrates 103, 107 mount thereon respective transparent electrodes 110, 111, which are applied with a voltage to impress an electric filed to the LC molecules.

The first orientation film 104 controls the orientation of the LC molecules on the interface of the LC layer 105 with respect to the first glass substrate 103. The second orientation film 106 controls the orientation of the LC molecules on the interface of the LC layer 105 with respect to the second glass substrate 107. The LC molecules on the interfaces of the LC layer 105 with respect to the first glass substrate 103 and second glass substrate 108 rise or tilt to a specific pre-tilt angle with respect to the substrate surface due to the function of the respective orientation films 104 and 106.

The first and second optical compensation films 102, 108 each have a negative refractive index anisotropy, and have an effective optical axis inclined from the normal line of the substrate surface by a specific angle. The first and second optical compensation films 102, 108 may be a negative single-axis retardation film, such as WV film (trademark) from Fuji film inc., including an incline-oriented discotic LC layer and a negative single-axis retardation layer having an optical axis parallel to the normal line of the substrate surface. In an alternative, the first and second optical compensation films 102, 108 may be formed by roll-extending a polymer film at different rotational speeds of a roller, as described in JP-A-6(1994)-222213. The longer axis of the projection of the refractive index ellipsoids configuring the first and second optical compensation films may be determined from Rth value and inclined-angle β value measured with KOBRA-21DH (trademark) supplied from Oji-Metering-Equipment inc.

Figure 2:
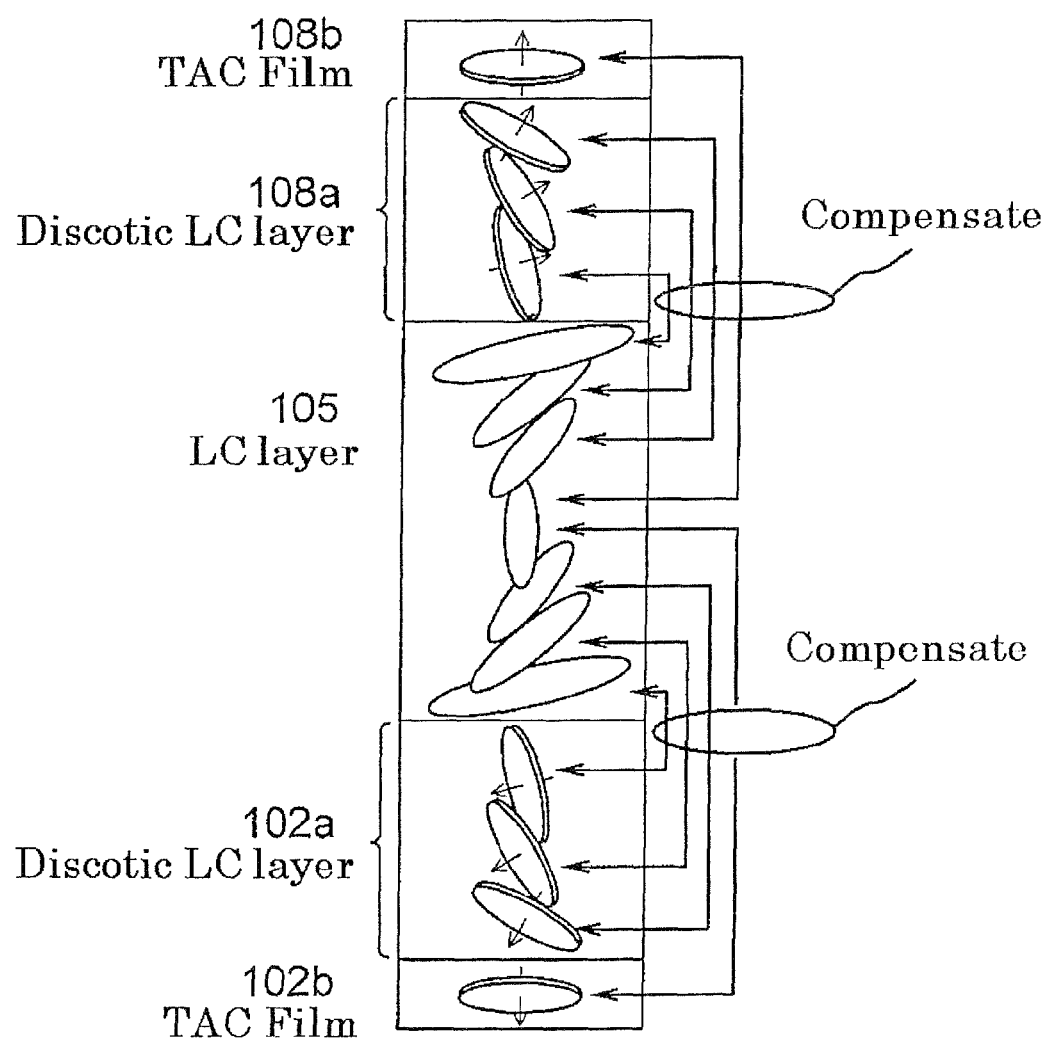
FIG. 2 is a schematic sectional diagram of the LCD device of FIG. 1, showing the arrangement of LC molecules upon display of black color and the optical characteristic of the optical compensation films.

FIG. 2 schematically shows the arrangement of the LC molecules in the LC layer 105 upon display of black color and the optical characteristic of the first and second optical compensation films 102, 108. In this figure, the first and second glass substrates 103, 107 are omitted for depiction, and the twisted angle of the LC is neglected.

FIG. 2 shows the case where the applied voltage is around three to four times the threshold voltage, i.e., Freederickzs transition point Vth of the LC. In this case, the LC molecules in the vicinity of the interfaces of the LC layer 105 with respect to the first and second glass substrates do not rise to a specific tilt angle, thereby generating a residual retardation caused by the LC molecules. The LC layer 105 is depicted to have three portions including a rear portion, central portion and a front portion, which are arranged in this order as viewed in the direction of light transmission.

In FIG. 2, the direction of the residual retardation generated in the LC layer can be determined based on physical properties of the LC including elastic coefficients $K_{11}$, $K_{22}$ and $K_{33}$ thereof and the structure of the LC cell including the gap of the LC cell, i.e., thickness of the LC layer 105. The elastic coefficients of the LC can be measured using the method described in a literature entitled "Liquid Crystal vol. 6, No. 4", p 390-399, 2002. The method for determining the refractive index and rotational viscosity of LC is described in a literature entitled "LC, vol. 6 No. 3", p 295-302 (2002). The structure of the LC cell such as the twisted angle of the LC and the thickness and pre-tilt angle of the LC layer can be measured using LCA-LU4A (trademark) from Nabishi. The applied voltage upon display of black color can be directly measured by measuring the driving voltage.

The residual retardation can be calculated by: applying the physical properties and cell parameters thus obtained to an LCD simulator, such as LCD master from Sintec Inc. to calculate the arrangement of the LC molecules in the LC cell; extracting the arrangement of an LC layer having half the thickness of the LC layer thus calculated; forming an LC layer model from the LC layer having the half thickness in the LCD simulator; impinging linearly-polarized light onto the LC layer model in the vertical direction; analyzing polarization of the light passed by the LC layer a model; and executing the optical calculation thereto.

For example, the direction of the longer axis of the refractive index ellipsoid projected onto the substrate surface is determined by: impinging a linearly-polarized light onto the LC layer model in the direction normal to the substrate surface in the LCD simulator; analyzing the polarization of the impinged light after the impinged light exits the LC layer model; and extracting the direction in which the S3 component of the S-parameters in the polarization of the exiting light assumes zero.

In FIG. 2, the first compensation film 102 compensates a residual retardation of the LC in the rear portion thereof near the first compensation film 102. The first optical compensation film 102 includes a discotic LC section 102a, wherein a plurality of discotic LC layers having different directions of optical axis are stacked one on another, and a TAC (triacetyl-cellulose) film 102b. In the exemplified case, the discotic LC section 102a includes three discotic LC layers, and one of the discotic LC layers nearest to the LC layer 105 has an optical axis substantially parallel to the longer axis of the LC molecules in one of three virtual thin LC films nearest to the first optical compensation film 102 upon display of black color, to thereby compensate the residual retardation of the virtual thin LC film.

The central discotic LC layer of the first optical compensation film 102 is disposed so that the optical axis thereof is substantially parallel to the longer axis of the LC molecules in the central virtual thin LC film in the rear portion of the LC layer 105 upon display of black color, to thereby compensate the residual retardation of the central virtual thin LC film. The discotic LC layer nearest to the TAC film 102b is disposed so that the optical axis thereof is substantially parallel to the longer axis of the LC molecules in the front virtual thin LC film of the rear portion of the LC layer 105, to thereby compensate the residual retardation thereof.

The TAC film 102b has a negative single-axis optical characteristic and has an optical axis normal to the substrate surface, thereby compensating the residual retardation of the LC molecules in the central portion of the LC layer 105.

The second optical compensation film 108 compensates the residual retardation of the front portion of the LC layer 105 near the second optical compensation film 104 upon display of black color. The second optical compensation film 108 includes a discotic LC section 108a, wherein a plurality of discotic LC layers having different directions of the optical axis are stacked one on another, and a TAC film 108b.

As exemplarily illustrated in FIG. 2, the discotic LC section 108a includes three discotic LC layers, and one of the discotic LC layers nearest to the LC layer 105 has an optical axis substantially parallel to the longer axis of the LC molecules in one of three virtual thin LC films nearest to the second optical compensation film 108 upon display of black color, to thereby compensate the residual retardation thereof.

The central discotic LC layer of the second optical compensation film 108 is disposed so that the optical axis thereof is substantially parallel to the longer axis of the LC molecules in the central virtual thin LC film in the front portion of the LC layer 105 upon display of black color, to thereby compensate the residual retardation of the central virtual LC film. The discotic LC layer nearest to the TAC film 102b is disposed so that the optical axis thereof is substantially parallel to the longer axis of the LC molecules in the rear virtual thin LC film of the front portion of the LC layer 105, to thereby compensate the residual retardation thereof.

The TAC film 108b has a negative single-axis optical characteristic and has an optical axis normal to the substrate surface, thereby compensating the residual retardation of the LC molecules in the central portion of the LC layer 105.

Figure 3:
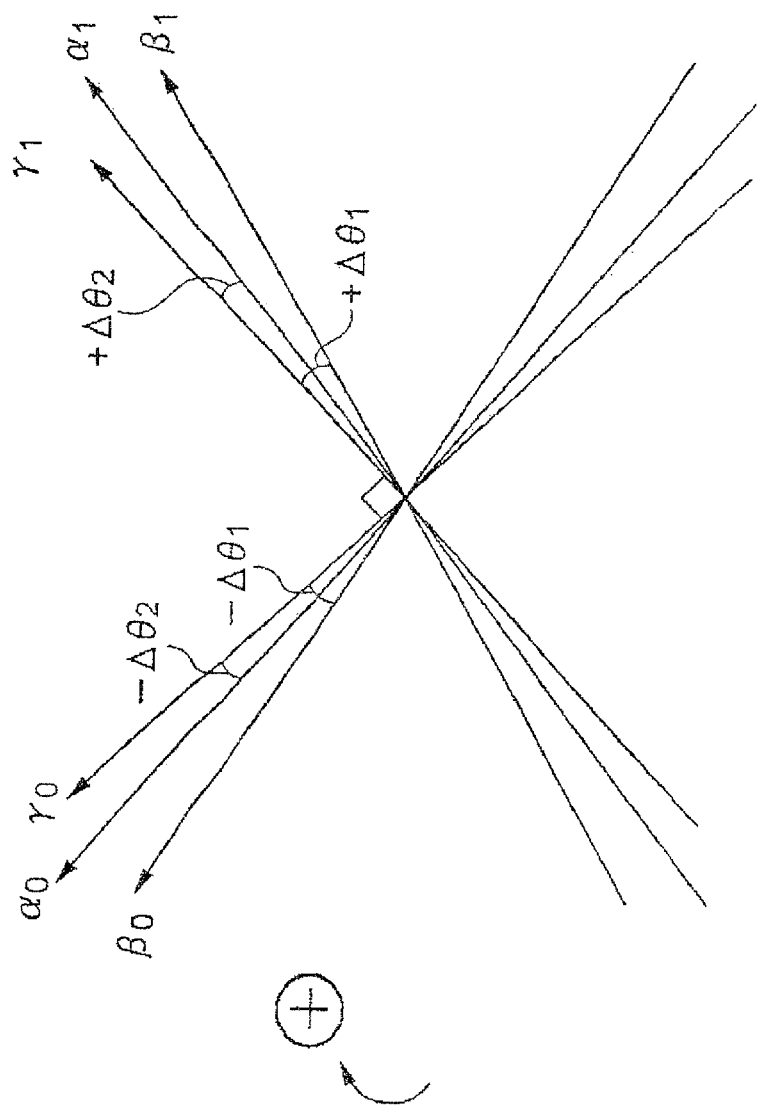
FIG. 3 is a schematic diagram of the LCD device of FIG. 1, showing the orientation of the LC molecules and the effective optical axis of the optical compensation films, which are projected onto the substrate surface.

FIG. 3 shows the relationship between the orientation of the LC molecules and the equivalent optical axis of the first and second optical compensation films 102 and 108, which are shown in the state projected onto the substrate surface. In FIG. 3, a $\alpha 0$ and $\alpha 1$ represent the equivalent optical axes of the first and second polarization films 102 and 108, respectively, $\beta 0$ and $\beta 1$ represent the longer axes of the LC molecules on the interfaces of the LC layer 105 with respect to the first and second substrates 103 and 107, respectively, upon application of zero voltage, $\gamma 0$ and $\gamma 1$ represent the polarization axes of the first and second polarization films 101 and 109, respectively.

As shown in FIG. 2, the angle measured from the polarization axis $\gamma 0$ of the first polarization film to the longer axis $\beta 0$ of the LC molecules projected onto the substrate surface is set at $-\Delta\theta 1$ ($\Delta\theta 1 > 0$). It is assumed in this text that the clockwise rotation as viewed along the direction of light transmission for measuring an angle from one axis to another axis is a positive rotation, which provides the angle measured by the rotation with a positive sign. The angle measured from the polarization axis $\gamma 1$ of the second polarization film 109 to the longer axis $\beta 1$ of the LC layer projected onto the substrate surface is set at $\Delta\theta 1$, the angle measured from the polarization axis $\gamma 0$ of the first polarization film 102 to the effective optical axis $\alpha 0$ of the first optical compensation film is set at $-\Delta\theta 2$ ($\Delta\theta 2 > 0$), and the angle measured from the polarization film $\gamma 1$ of the second optical compensation film 109 to the optical axis $\alpha 1$ of the second optical compensation film projected onto the substrate surface to is set at $\Delta\theta 2$.

Figure 4:
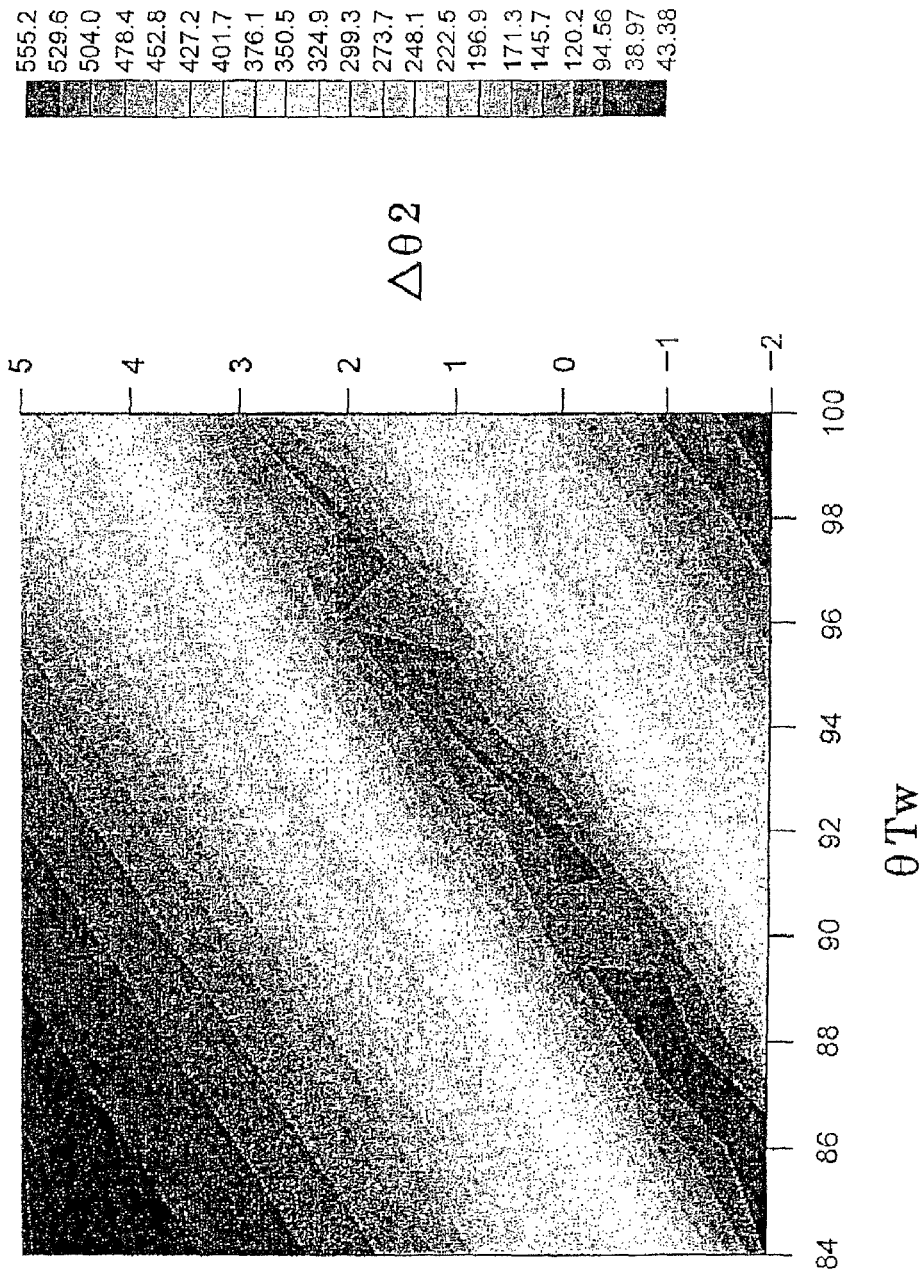
FIG. 4 is a graph obtained by simulation and showing the contrast ratio in the front view in the case of the combination of the twisted angle of the LC layer and angle $\Delta\theta 2$ between the optical axis of the optical compensation film and the polarizing axis of the polarizing film.

FIG. 4 shows simulated results of the contrast ratio observed in the front view in the case of the combination of the twisted angle $\theta Tw$ of the LC layer and the angle $\Delta\theta 2$ between the effective optical axis of the optical compensation film and the polarization axis of the polarization film. In FIG. 4, the twisted angle $\theta Tw$ is plotted on the abscissa, whereas the angle $\Delta\theta 2$ is plotted on the ordinate. Since the polarization axis $\alpha 0$ of the first polarization film 101 is perpendicular to the polarization axis $\alpha 1$ of the second polarization film 109 as shown in FIG. 3, the twisted angle $\theta Tw$ of the LC layer 105 can be expressed by the following formula:

$$\theta Tw = 90 + \Delta\theta 1.$$

If the angle $\Delta\theta 1$ changes from −3 degrees to +5 degrees to change the twisted angle $\Delta Tw$ from 84 degrees to 100 degrees, and if the angle $\Delta\theta 2$ between the effective optical axis of the first optical compensation film (or second optical compensation film) and the polarization axis of the first polarization film (or second polarization film) is changed between −2 degrees and +5 degrees, then the contrast ratio in the front view is changed as shown in FIG. 4. It is to be noted that a higher contrast ratio achieved in the front view means a higher contrast ratio in all the viewing angles. Thus, the improvement of the contrast ratio in the font view leads to an improvement in the slanted viewing in the horizontal direction and in either the top or bottom direction is obtained.

The upper limit line and lower limit line of the hatched range can be expressed by approximate formulas of $\theta Tw$ and $\Delta\theta 2$ as follows: direction, to thereby improve the viewing angle characteristic.

Figure 5:
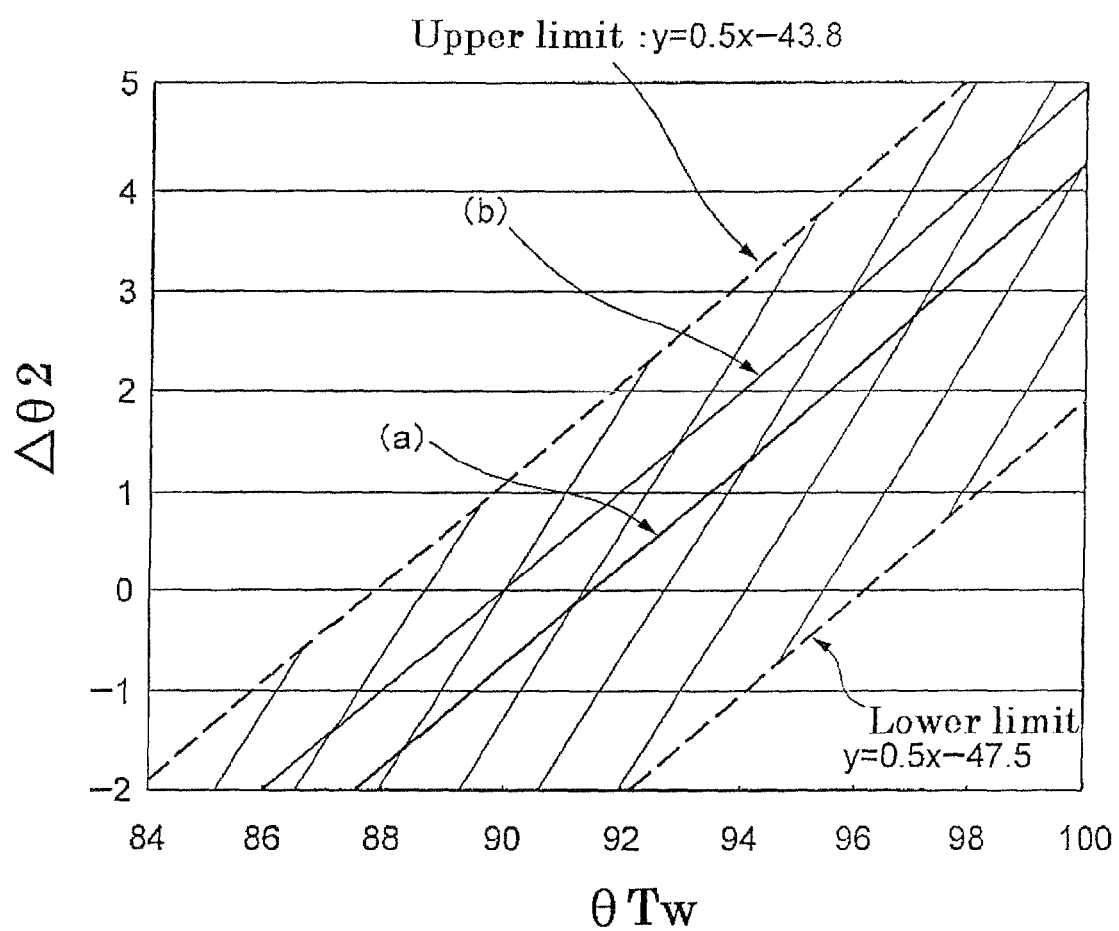
FIG. 5 is a graph obtained by simulation and showing the range achieving a desired viewing angle characteristic in the combination of the twisted angle of the LC layer and the angle $\Delta\theta 2$.

FIG. 5 shows a simulated result of the area for combination of the twisted angle $\theta Tw$ and the angle $\Delta\theta 2$ that achieves a desired viewing angle characteristic in the horizontal direction and in either the top or bottom direction, wherein a viewing angle of 80 degrees or above provides a contrast ratio of 10:1 or above. The simulation is conducted in the conditions that the twisted angle θTw is changed between 84 degrees and 100 degrees, and that the angle Δθ2 between the effective optical axis of the second optical compensation film (also first optical compensation film) and the polarization axis of the second polarization film (first polarization film) is changed between −2 degrees and +5 degrees. Among the area defined by these ranges of angle in FIG. 5, the hatched area achieving the desired viewing angle characteristic Upper limit line: $\Delta\theta2=0.5\times\theta Tw-43.8$ (1); and Lower limit line: $\Delta\theta2=0.5\times\theta Tw-47.5$ (2).

Thus, the range of Δθ2 defined by the following relationship:

$$0.5\times\theta Tw-47.5 \leq \Delta\theta2 \leq 0.5\times\theta Tw-43.8 \quad (3)$$

achieves the desired viewing angle characteristic in the horizontal direction including left and right directions and in either the top or left direction in the vertical direction.

In the LCD device 100 of the present embodiment, as shown in FIG. 2, application of electric field to the LC layer 105 for display of black color tilts the LC molecules at the middle of the LC layer 105 to the direction at which the LC molecules are perpendicular to the substrate surface. However, the LC molecules on the interface of the LC layer with respect to the first substrate or second substrate are restricted by the orientation film and scarcely tilt from the direction of substrate surface. The LC molecules disposed between the interface and the middle of the LC layer 105 are arranged so that these LC molecules have tilt angles consecutively interpolating the tilt angles of the interface and the middle, as shown in FIG. 2 and so that these LC molecules are gradually twisted from the interface toward the middle. This incurs a residual retardation upon display of black color in general driving conditions.

If the residual retardation upon display of black color is expressed by an equivalent refractive index ellipsoid, the longer axis, i.e., optical axis of the refractive index ellipsoid projected onto the substrate surface resides in the direction slightly shifted toward right from the orientation β0 (in FIG. 3) of the LC molecules in the LC layer 105 oriented by the first orientation film 104 in the direction of twist, in the vicinity of the interface with respect to the first substrate 103. The longer axis also resides in the direction slightly shifted toward left from the orientation β1 (in FIG. 3) of the LC molecules in the LC layer 105 oriented by the second orientation film 106 in the direction of twist, in the vicinity of the interface with respect to the second substrate 107.

FIG. 5 shows the angle, i.e., deviated angle Δθ2 of the second optical compensation film 108 with respect to the polarization axis 109, plotted for each twisted angle. In FIG. 5, the upper dotted line represents the equation (1), the lower dotted line represents the equation (2), graph (a) represents the deviated angle of the longer axis of the refractive index ellipsoid with respect to the absorption axis (polarization axis) of the polarization film, and graph (b) represents the deviated angle of the LC molecules in the vicinity of the interface with respect to the absorption axis of the polarization film.

As understood from FIG. 5, graph (a) representing the deviated angle of the longer axis of the refractive index ellipsoid resides between the upper dotted line and the lower dotted line which represent the upper limit and lower limit, respectively, for achieving the viewing angle characteristic in the horizontal direction and in either the top or bottom direction. This means that the desired viewing angle characteristic wherein the contrast ratio of 10:1 or above is obtained within the viewing angle of 80 degrees or above can be achieved by aligning the optical axis α0 of the first optical compensation film 102 with the optical axis of the refractive index ellipsoid of the residual retardation generated upon display of black color in the vicinity of the interface of the LC layer 105 with respect to the first substrate 103 and by aligning the optical axis α1 of the second optical compensation film 108 with the optical axis of the refractive index ellipsoid of the residual retardation generated in the vicinity of the interface of the LC layer with respect to the second substrate 107.

In FIG. 5, as described above, graph (b) representing the angle between the longer axis of the LC molecules on the interface and the polarization axis is also plotted for each pre-tilt angle. Comparing graph (a) with graph (b), graph (b) resides near the upper dotted line or upper limit of the desired viewing angle characteristic, revealing a narrower product margin for achieving the desired viewing angle characteristic. More specifically, if the configuration wherein the optical axis of the first optical compensation film (or second optical compensation film) is parallel to the longer axis of the LC molecules on the interface is employed, the deviated angle Δθ2 of the optical compensation film with respect to the polarization axis may exceed the upper limit represented by equation (1) due to variation in the fabrication process. In such a case, the desired viewing angle characteristic wherein the contrast ratio of 10:1 or above is achieved within the viewing angle of 80 degrees or above in the horizontal direction cannot be obtained.

In the present embodiment, as described above, the deviated angle Δθ2 of the optical compensation film with respect to the polarization axis satisfies the relationship (3) so that the optical axis of the optical compensation film substantially aligns with the equivalent refractive index of the residual retardation generated upon display of black color. In addition, the angle between the optical axis of the first optical compensation film 102 projected onto the substrate surface and the optical axis of the second optical compensation film 108 projected onto the substrate surface is made lower than the twisted angle θTw so that the optical axis of the optical compensation film aligns with the residual retardation of the equivalent refractive index ellipsoid of the residual retardation. This configuration allows the residual retardation of the LC layer upon display of black color to be compensated by the optical compensation films 102, 108, whereby the desired viewing angle characteristic can be obtained, wherein viewing angle of 80 degrees or above achieving the contrast ratio of 10:1 is obtained in the horizontal direction including left and right directions and either top or bottom direction.

Figure 6:
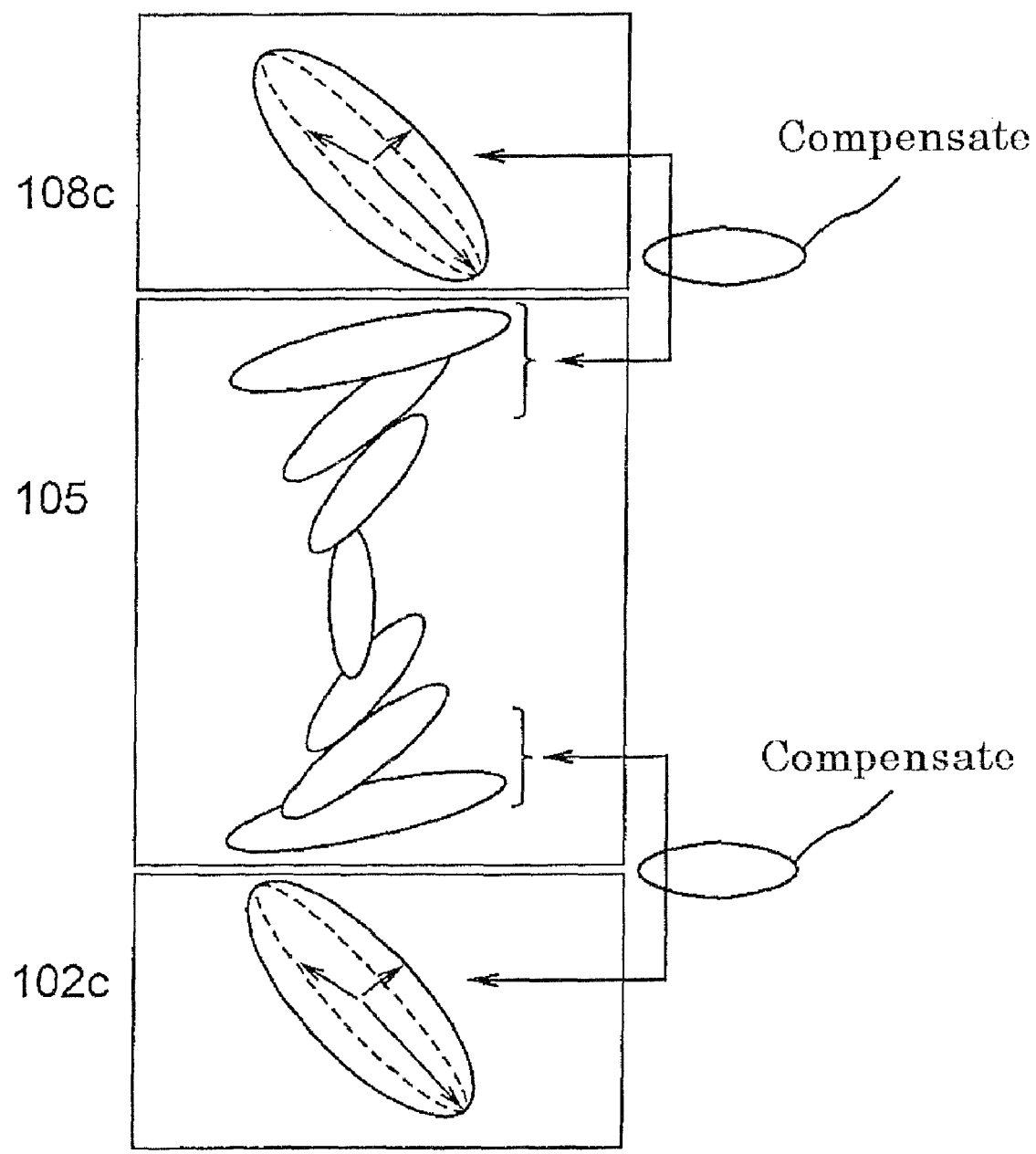
FIG. 6 is a schematic sectional diagram of an LCD device according to a second embodiment of the present invention.

FIG. 6 shows the function of the first and second optical compensation films in an LCD device according to a second embodiment of the present invention. The structure of the LCD device of the present embodiment is similar to that of the LCD device shown in FIG. 1, and the function of the first and second optical compensation films in the present embodiment is different from that of those in the first embodiment. In the present embodiment, the first and second optical compensation films 102c, 108c each have a negative single-axis optical characteristic, wherein the single optical axis thereof is inclined from the substrate surface by a specific angle.

The first optical compensation film 102c is disposed so that the optical axis thereof is substantially parallel to the average optical axis of the LC molecules in the vicinity of the interface of the LC layer 105 with respect to the first substrate 103, thereby compensating the residual retardation of the LC layer 105 in the vicinity of the interface. Similarly, the second optical compensation film 108c is disposed so that the optical axis thereof is substantially parallel to the average optical axis of the LC molecules in the vicinity of the interface of the LC layer 105 with respect to the second substrate 107, thereby compensating the residual retardation of the LC layer 105 in the vicinity of the interface. The angle measured from the polarization axis γ0 of the first polarization film 101 to the optical axis α0 of the first optical compensation film 102c projected onto the substrate surface is set at −Δθ2, as shown in FIG. 2. The angle measured from the polarization axis γ1 of the second polarization film 109 to the optical axis α1 of the second optical compensation film 108c projected onto the substrate surface is set at Δθ2.

In the configuration wherein the first and second polarization films 102c, 108c each have a negative single-axis optical characteristic, by setting the deviated angle of the optical axis of the optical compensation films 102c, 108c with respect to the polarization axis at ±Δθ2 which satisfies the relationship (3), and more preferably by allowing the optical axis of the optical compensation films to coincide with the longer axis of the equivalent refractive index ellipsoid of the residual retardation upon display of black color, the residual retardation can be compensated by the first and second optical compensation films 102c, 108c, whereby the desired viewing angle characteristic can be obtained.

In the present embodiment, the absorption axis of the polarization film is substantially parallel to the orientation of the LC molecules on the interface of the LC layer 105 with respect to the adjacent substrate, whereby the transmission axis is substantially perpendicular to the orientation of the LC molecules to achieve an o-mode. However, this configuration is not essentially, and an e-mode can be also employed wherein the absorption axis is substantially perpendicular to the orientation of the LC molecules in the vicinity of the interface, and thus the transmission axis is substantially parallel to the orientation.

Since the above embodiments are described only for examples, the present invention is not limited to the above embodiments and various modifications or alterations can be easily made therefrom by those skilled in the art without departing from the scope of the present invention.

What is claimed is:

1. A normally-white liquid crystal display (LCD) device comprising a first polarization film, a first optical compensation film, a first substrate, a first transparent electrode, a first orientation film, a twisted-nematic liquid crystal (LC) layer, a second orientation film, a second transparent electrode, a second substrate, a second optical compensation film, and a second polarization film, which are consecutively disposed in a direction of light transmission, wherein:

said first polarization film has a polarization axis perpendicular to a polarization axis of said second polarization film;

an optical axis of said first optical compensation film projected onto a substrate surface of said first or second substrate is substantially parallel to a longer axis of a first equivalent refractive index ellipsoid projected onto said substrate surface, said first equivalent refractive index ellipsoid representing a residual retardation of said LC layer in a vicinity of a first interface of said LC layer with respect to said first substrate upon display of black color by applying a first voltage between said first transparent substrate and said second transparent substrate to determine an orientation of LC molecules in said LC layer; and an optical axis of said second optical polarization film projected onto said substrate surface is substantially parallel to a longer axis of a second equivalent refractive index ellipsoid projected onto said substrate surface, said second equivalent refractive index ellipsoid representing a residual retardation of said LC layer in a vicinity of a second interface of said LC layer with respect to said second substrate upon said display of black color, wherein said first optical compensation film comprises a plurality of LC layers each compensating a retardation of distinct LC molecules within a first portion of said LC layer on the first substrate side of said LC layer with each of said plurality of compensation film LC layers having an optical axis generally parallel to a long axis of the respective distinct LC molecule, and said second optical compensation film comprises a plurality of LC layers each compensating a retardation of distinct LC molecules within a second portion of said LC layer on the second substrate side of said LC layer with each of said plurality of compensation film LC layers having an optical axis generally parallel to a long axis of the respective distinct LC molecule, and wherein the following relationship: $0.5 \times \theta Tw - 47.5 \leq \Delta\theta 2 \leq 0.5 \times \theta Tw - 43.8$ holds, where θTw is a twisted angle of said LC layer, Δθ2 (Δθ2>0) is an angle measured from said optical axis of said first optical compensation film projected onto said substrate surface to said polarization axis of said first polarization film, and −Δθ2 is an angle measured from said optical axis of said second optical compensation film projected onto said substrate surface to said polarization axis of said second polarization film, assuming that the angles are positive when measured in a clockwise direction as viewed along said direction of light transmission.

2. The LCD device according to claim 1, wherein said first voltage is three to four times a threshold voltage Vth of said LC layer, said threshold voltage Vth representing Freederickzs transition point of the LC in said LC layer.

3. The LCD device according to claim 1, wherein the following relationship: Δθ2>Δθ1 holds, assuming that an angle between said orientation of said LC layer in said vicinity of said first interface projected onto said substrate surface and said polarization axis of said first polarization film is −Δθ1 (Δθ1>0), and an angle between said orientation of said LC layer in said vicinity of said second interface projected onto said substrate surface and said polarization axis of said second polarization film is Δθ1.

4. The LCD device according to claim 1, wherein at least a viewing angle of 80 degrees in a horizontal direction provides a contrast ratio of 10:1 or above.

5. The LCD device according to claim 4, wherein at least a viewing angle of 80 degrees in either a top or bottom direction provides a contrast ratio of 10:1 or above.

6. The LCD device according to claim 1, wherein said first and second optical compensation films each have a negative single-axis optical characteristic wherein said optical axis thereof is inclined from said substrate surface by a specific angle.

7. The LCD device according to claim 6, wherein said first and second optical compensation films each include a plurality (n) of layers each including a negative single-axis optical characteristic.

8. The LCD device according to claim 7, wherein each of m layers among said n layers (0≦m<n) has an optical axis perpendicular to said substrate surface.

9. The LCD device according to claim 8, wherein (n−m) layers among said n layers other than said m layers are configured by (n−m) discotic layers each having a negative single-axis optical characteristic.

10. The LCD device according to claim 1, wherein said LCD device is an active-matrix-drive LCD device including a switching device in each of a plurality of pixels within the LCD device, and said switching device is a TFT (thin-film-transistor) or MIM (metal-insulator-metal) switching device.

11. A normally-white liquid crystal display (LCD) device comprising a first polarization film, a first optical compensation film, a first substrate, a first transparent electrode, a first orientation film, a twisted-nematic liquid crystal (LC) layer, a second orientation film, a second transparent electrode, a second substrate, a second optical compensation film, and a second polarization film, which are consecutively disposed in a direction of light transmission, wherein:

said first optical compensation film comprises a plurality of effective compensation LC layers;

a first one of said effective compensation LC layers nearer to said LCD device LC layer having an optical axis substantially parallel to the longer axis of a first LCD LC layer molecule disposed nearer to said first optical compensation film, upon display of black color; a second one of said effective compensation LC layers disposed further from said LCD device LC layer than said first effective compensation LC layer, having an optical axis substantially parallel to the longer axis of a second LC molecule disposed further into said the LCD device LC layer than said first LC molecule, upon the display of black color; and a third of said effective compensation LC layers disposed still further from the LCD device LC layer having an optical axis substantially parallel to the longer axis of a third LC molecule disposed still further into said LCD device LC layer than said second LC molecule, upon the display of black color, to thereby compensate with said effective compensation layers the residual retardation of said first, second and third LC molecules in said LCD device LC layer.

12. The liquid crystal display device of claim 11, wherein:

said second optical compensation film comprises a plurality of effective compensation LC layers;

a fourth one of said effective compensation LC layers nearer to said LCD device LC layer having an optical axis substantially parallel to the longer axis of a fourth LCD device LC layer molecule disposed nearer to said second optical compensation film, upon display of black color; a fifth one of said effective compensation LC layers disposed further from said LCD device LC layer than said fourth effective compensation LC layer, having an optical axis substantially parallel to the longer axis of a fifth LC molecule disposed further into said the LCD device LC layer than said fourth LC molecule, upon the display of black color; and a sixth of said effective compensation LC layers disposed still further from the LCD device LC layer than said fifth effective compensation LC layer having an optical axis substantially parallel to the longer axis of a sixth LC molecule disposed still further into said LCD device LC layer than said fifth LC molecule, upon the display of black color, to thereby compensate with said effective compensation layers in said second compensation film the residual retardation of said fourth, fifth and sixth LC molecules in said LCD device LC layer.

* * * * *